(12) United States Patent
Tošić et al.

(10) Patent No.: US 9,569,853 B2
(45) Date of Patent: Feb. 14, 2017

(54) PROCESSING OF LIGHT FIELDS BY TRANSFORMING TO SCALE AND DEPTH SPACE

(71) Applicant: Ricoh Innovations Corporation, Menlo Park, CA (US)

(72) Inventors: Ivana Tošić, Berkeley, CA (US); Kathrin Berkner, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/048,742

(22) Filed: Feb. 19, 2016

(65) Prior Publication Data

US 2016/0173849 A1   Jun. 16, 2016

Related U.S. Application Data

(63) Continuation-in-part of application No. 14/064,090, filed on Oct. 25, 2013.

(51) Int. Cl.
| | | |
|---|---|---|
| G06K 9/00 | (2006.01) |
| G06T 7/00 | (2006.01) |
| G06T 3/40 | (2006.01) |
| G06F 17/14 | (2006.01) |
| H04N 13/02 | (2006.01) |
| H04N 13/00 | (2006.01) |

(52) U.S. Cl.
CPC ............. *G06T 7/0051* (2013.01); *G06F 17/14* (2013.01); *G06T 3/4084* (2013.01); *H04N 13/0029* (2013.01); *H04N 13/0048* (2013.01); *H04N 13/0232* (2013.01); *G06T 2200/21* (2013.01); *G06T 2207/10052* (2013.01); *H04N 2013/0081* (2013.01)

(58) Field of Classification Search
CPC ........... G06F 17/14; G06T 7/0051; G06T 5/10
See application file for complete search history.

(56) References Cited

U.S. PATENT DOCUMENTS

| | | | | |
|---|---|---|---|---|
| 8,244,058 B1 * | 8/2012 | Intwala | ...................... | G06T 5/10 382/275 |
| 9,113,043 B1 * | 8/2015 | Kim | ....................... | H04N 13/02 |
| 2011/0032337 A1 * | 2/2011 | Rodriguez Ramos | ................... | G06T 15/205 348/49 |
| 2012/0218386 A1 * | 8/2012 | Brady | ................... | H04N 13/026 348/46 |
| 2015/0117756 A1 * | 4/2015 | Tosic | ...................... | G06F 17/14 382/154 |

* cited by examiner

*Primary Examiner* — Gregory M Desire
(74) *Attorney, Agent, or Firm* — Fenwick & West LLP

(57) ABSTRACT

Light field images of a three-dimensional scene are transformed from an (image,view) domain to an (image,scale,depth) domain. Processing then occurs in the (image,scale,depth) domain.

20 Claims, 10 Drawing Sheets

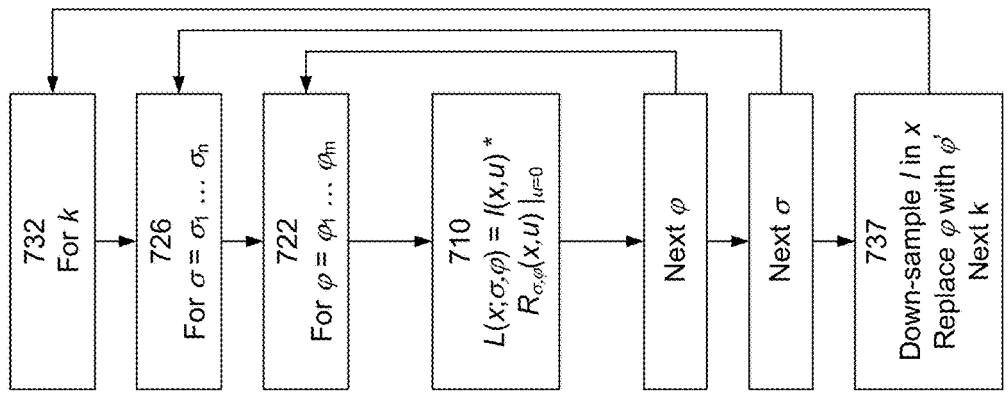
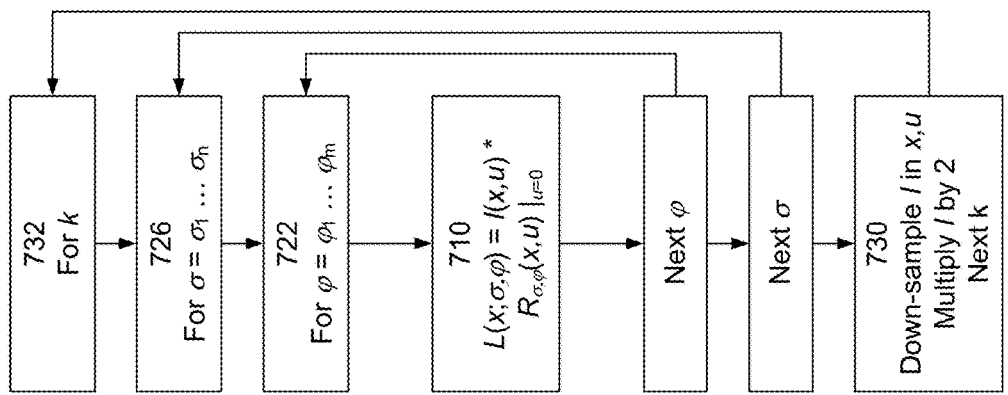
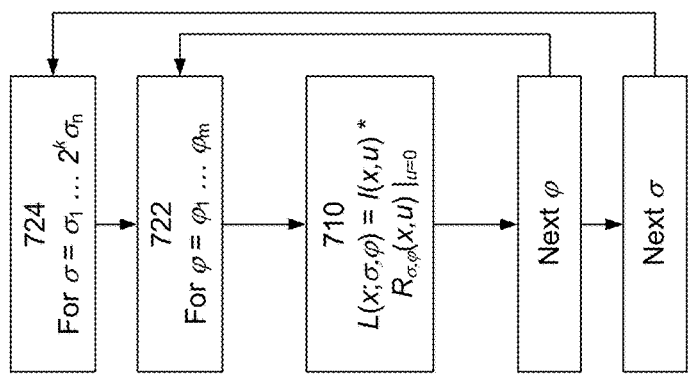

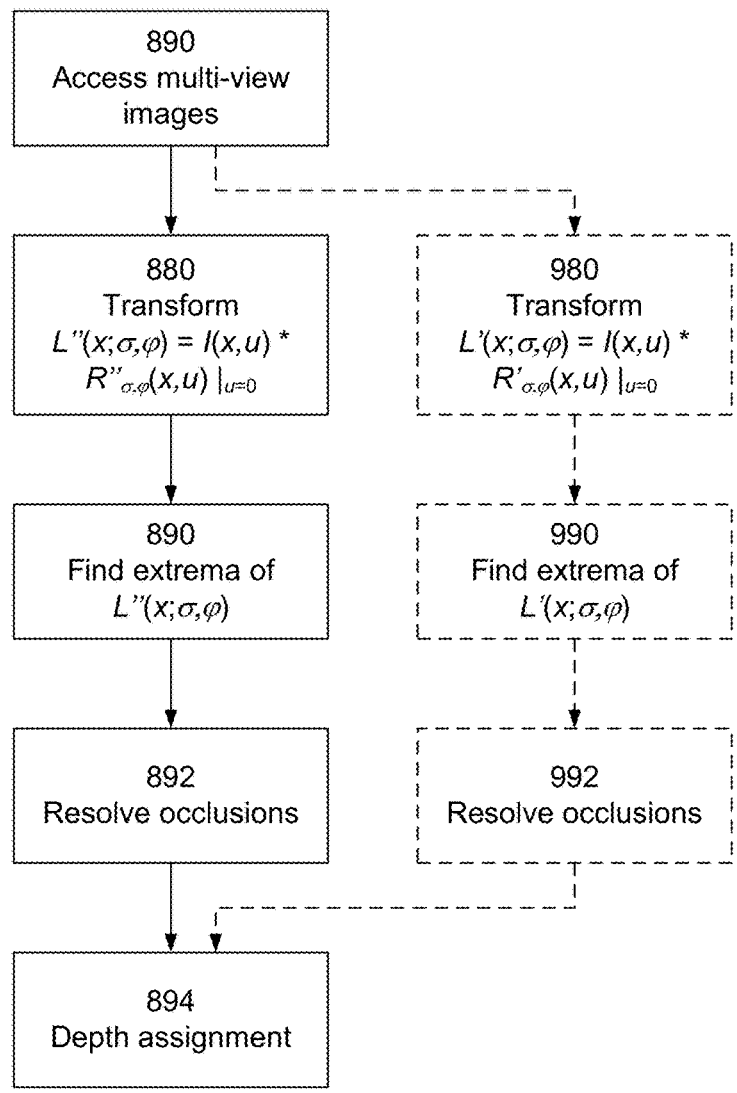
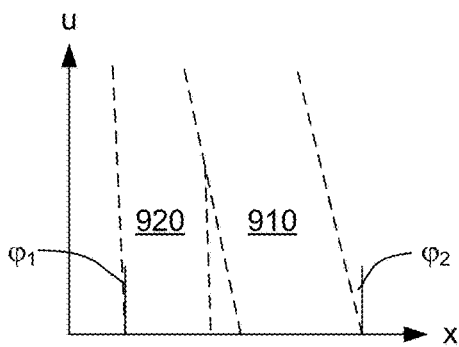
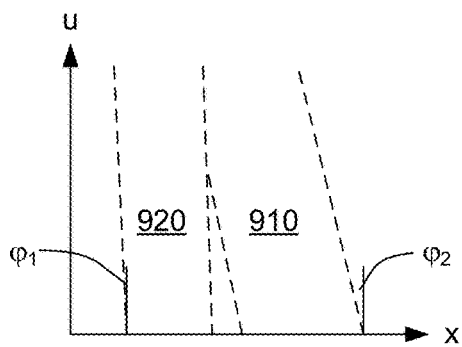

PROCESSING OF LIGHT FIELDS BY TRANSFORMING TO SCALE AND DEPTH SPACE

CROSS-REFERENCE TO RELATED APPLICATION(S)

This application is a continuation-in-part of U.S. patent application Ser. No. 14/064,090, "Processing of Light Fields by Transforming to Scale and Depth Space," filed Oct. 25, 2013. The subject matter of all of the foregoing is incorporated herein by reference in its entirety.

BACKGROUND OF THE INVENTION

1. Field of the Invention

This invention relates generally to the processing of light fields (including multi-view images) of three-dimensional scenes, for example the processing of light fields of a three dimensional scene captured by a plenoptic imaging system.

2. Description of the Related Art

Light fields have been first introduced in the computer graphics community for representing three-dimensional scenes via multiple views of that scene taken from different viewpoints. In general, the light field of a scene is a seven-dimensional function that contains two-dimensional images (i.e., light field images) of the scene taken from any viewpoint in three-dimensional space, at any wavelength and any time instant. In computer graphics applications, a computer can render the scene from any viewpoint because it has the explicit three-dimensional scene model, including its three-dimensional shape and texture. That is, the computer can render any of the light field images and therefore can also calculate the entire light field of the scene.

Recently, systems have been developed for capturing a four-dimensional light field of three-dimensional scenes. These systems include camera arrays and plenoptic imaging systems. These systems typically capture a four-dimensional light field: two-dimensional images of a scene taken from various viewpoints on a two-dimensional surface (rather than allowing any viewpoint in three-dimensional space), at a certain wavelength (or wavelength band) and time instant. In these systems, the three-dimensional scene information is not explicitly captured. Rather, it is implicitly contained within the pixels of the captured four-dimensional light field.

Extracting three-dimensional information from the four-dimensional light field is an inverse problem. It is a challenging problem because of the high dimensionality of light fields. Dense depth estimation (e.g., estimating depth of each pixel in a scene) is one of those challenging problems, because obtaining a globally smooth and consistent depth map typically requires global optimization, which is usually of prohibitive complexity for such high-dimensional data processing.

Therefore, there is a need for light field processing approaches that efficiently and robustly extract depth and other information from light fields.

SUMMARY

The present invention overcomes the limitations of the prior art by transforming light field images of a three-dimensional scene (e.g., multi-view images) from an (image, view) domain to an (image,scale,depth) domain. Processing then occurs in the (image,scale,depth) domain. The light fields described above are captured in the (image,view) domain. They can be captured by a plenoptic imaging system, camera array or other types of multi-view imaging systems. It is a representation of a three-dimensional scene as two-dimensional images seen from multiple viewpoints. In the (image,scale,depth) domain, scale refers to different sizes of objects in the three-dimensional scene and depth refers to the depth of objects in the three-dimensional scene.

For convenience, the process of transforming from an (image,view) domain to an (image,scale,depth) domain may be referred to as scale-depth transform, and the resulting representation may be referred to as the scale-depth transform of the original light field. Different transformations are possible and the term "scale-depth transform" is a generic term intended to include all transforms from the (image, view) domain to the (image,scale,depth) domain.

In one approach, the scale-depth transform is based on a Ray-Gaussian kernel, or its derivatives (including normalized derivatives). "Ray" in Ray-Gaussian refers to the fact that, for regularly spaced viewpoints on a flat plane, a point in the three-dimensional scene will manifest itself as a straight line in (image,view) space. The angle of this line corresponds to the depth of the point, where the mapping from the angle to the depth depends on camera parameters. Adjacent points at the same depth will then create a "ray" with a finite cross-sectional area in (image,view) space. The angle of the ray corresponds to the (depth) portion of the (image,scale,depth) domain. "Gaussian" in Ray-Gaussian refers to use of the Gaussian kernel to implement the (scale) portion of the (image,scale,depth) domain. An example of a Ray-Gaussian kernel for a two-dimensional slice of a light field is $$\mathcal{R}_{\sigma,\varphi}(x, u) = \frac{1}{\sigma\sqrt{2\pi}} e^{-\frac{(x+u\tan\varphi)^2}{2\sigma^2}}$$

where x is a coordinate from the (image) domain, u is a (view) coordinate, σ is a (scale) coordinate, and ϕ is a (depth) coordinate. This particular formulation has some advantageous properties that allow for a fast transform. This example Ray Gaussian kernel is defined for a two-dimensional slice of a light field, but the transform is not limited to this case as it can be extended to define a kernel for three-dimensional slices or even the entire light field.

Examples of processing that can be performed in the (image,scale,depth) domain are depth estimation and 3D feature extraction. In one approach, the scale-depth transform is based on the second-order partial derivative of the Ray-Gaussian kernel, and depth estimation is based on finding extrema in the scale-depth transform of the light field. In another approach, the scale-depth transform is based on the first derivative of the Ray-Gaussian kernel, and finding extrema of the transformed light field can be used for 3D feature detection, such as edge detection.

Other aspects of the invention include methods, devices, systems, components, and applications related to the concepts described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 7A-7C are flow diagrams showing different methods for calculating a Ray-Gaussian transform.

FIG. 8 is a flow diagram illustrating depth estimation.

FIGS. 9A-9B are diagrams illustrating possible occlusions.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Light Fields

Figure 1:
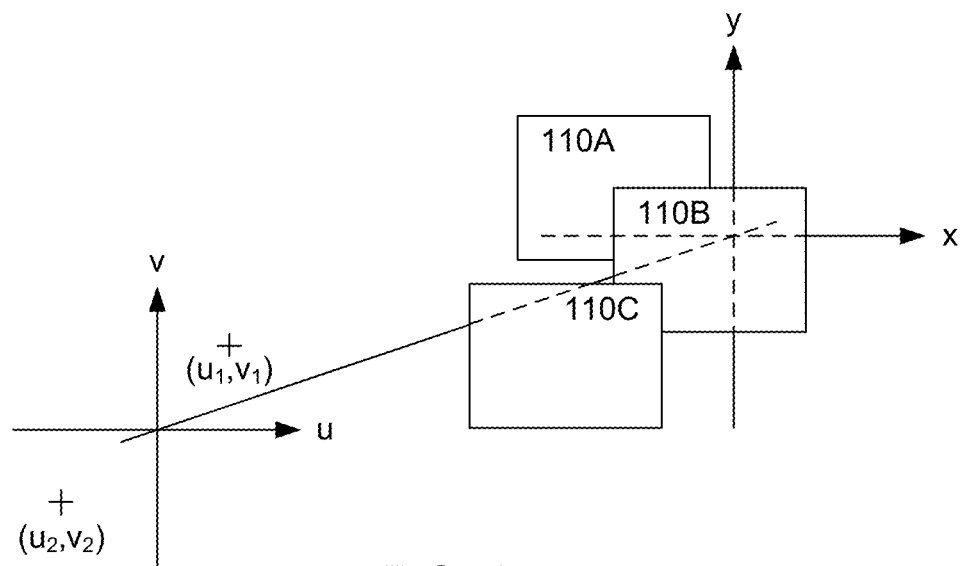
FIG. 1 is a diagram illustrating a three-dimensional scene.

In the following example, we express the light field as radiance at any point in space in any given direction. The light field can be parameterized as a four-dimensional function that represents the radiance of a light ray observed at location (u,v), on a given reference surface, and coming from a point source at the location (x,y), as shown in FIG. 1. We denote the light field as I(x,y,u,v).

FIG. 1 shows a simplified three-dimensional scene with three objects 110A-C. FIG. 1 also shows a reference (x,y) plane and a reference (u,v) plane. Two points $(u_1,v_1)$ and $(u_2, v_2)$ are also shown. The (u,v) plane can be thought of as a viewpoint plane, and the coordinates (u,v) define a space that will be referred to as the (view) domain. The light field image $I(x,y,u_1,v_1)$ is the image that would be seen by an observer from the viewpoint $(u_1,v_1)$. It can be thought of as the image that would be captured by a pinhole camera where the pinhole is located at position $(u_1,v_1)$. Similarly, the light field image $I(x,y,u_2,v_2)$ is the image that would be seen by an observer located at viewpoint $(u_2,v_2)$. In FIG. 1, the (x,y) plane is drawn in object space but it is more appropriately thought of as a universal coordinate system defined in image space. It is universal in the sense that all light field images are defined relative to a common (x,y) coordinate system. The coordinates (x,y) define a space that will be referred to as the (image) domain.

Thus, the light field I(x,y,u,v) may sometimes be referred to as an (image,view) domain representation of the three-dimensional scene, because it is a representation of the three-dimensional scene from the (image) and (view) domains. Devices may be used to capture images in this space. For example, plenoptic cameras, camera arrays or other types of multi-view imaging devices may be used to capture images of the three-dimensional scene from different viewpoints. Mathematically, these devices sample the light field I(x,y,u,v) at different values of (u,v). The set of images may also be referred to as multi-view images of the three-dimensional scene. However, as discussed previously, it can be difficult to directly process these multi-view images to extract the three-dimensional information that is inherently captured within them.

Figure 2:
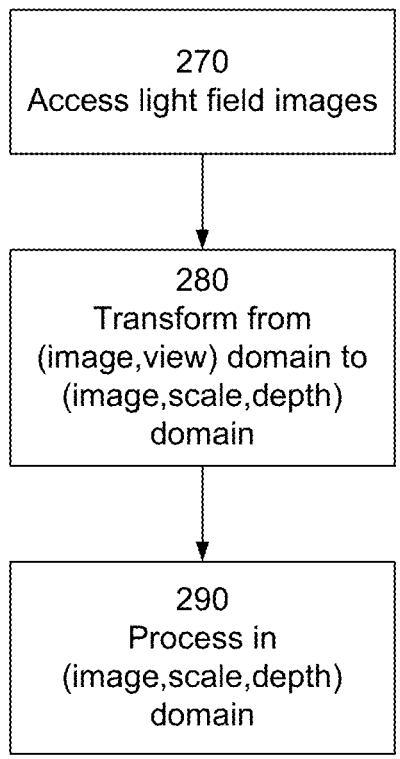
FIG. 2 is a flow diagram of a method for processing light field images according to the invention.

FIG. 2 is a flow diagram of a method for processing light field images according to the invention. Instead of processing the light field images directly in the (image,view) domain, the provided 270 light field images are transformed 280 from the (image,view) domain to an (image,scale,depth) domain and processing 290 then occurs in that domain instead. The transformation 280 will be referred to as a scale-depth transform. Each of the (scale) and (depth) domains, including the transform to the (image,scale,depth) domain, is described in more detail below. For clarity, the explanations below use one-dimensional "images," but the extension to two dimensions is straightforward. The (image), (view), (scale), and (depth) dimensions are represented by the coordinates x, u, $\sigma$ and $\phi$, respectively.

(Depth) Domain

Figure 3A:
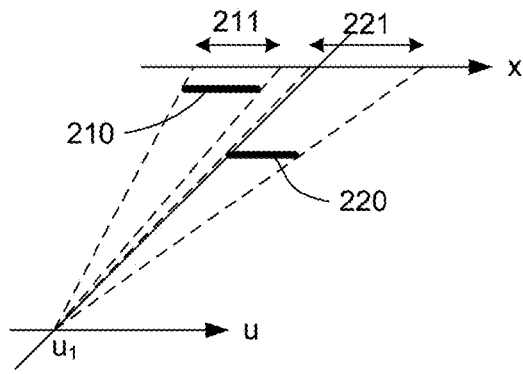
FIGS. 3A-3C are diagrams illustrating two objects viewed from three different viewpoints.

If we look at some examples of two-dimensional slices I(x,u) of light fields, as shown in FIGS. 3A-3D, we can see a line structure inherent to the characteristics of light fields with uniformly spaced viewpoints, where the angle of the line in the (x,u) domain corresponds to different depths in the scene. FIG. 3A shows two objects 210 and 220 which are at different depths. Object 220 is forward of object 210. It may or may not occlude object 210, depending on the viewpoint u.

Figure 3B:
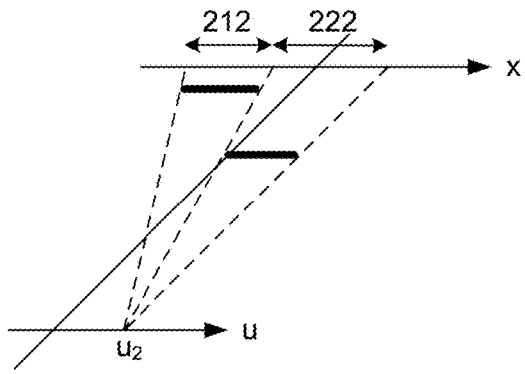
Figure 3C:
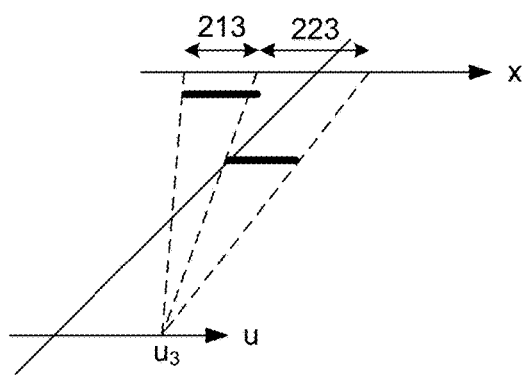
Figure 3D:
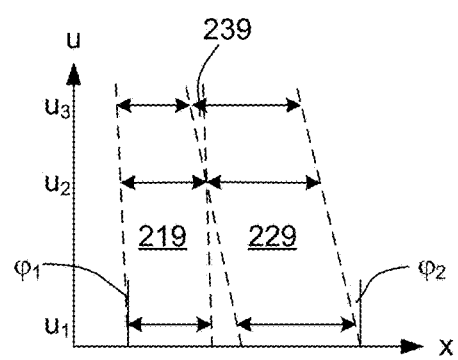
FIG. 3D is a diagram illustrating an (x,u) slice of the corresponding light field.

FIG. 3A is taken from viewpoint $u_1$. From this viewpoint, object 210 occupies the x interval 211 and object 220 occupies the x interval 221. The two intervals 211 and 221 do not overlap and there is no occlusion. FIG. 3D shows a two-dimensional (x,u) slice of the light field for these two objects. The x-slice of FIG. 3A is marked by $u_1$ on the vertical u axis. The two intervals 211 and 221 are reproduced as the two line segments at coordinate $u=u_1$ in FIG. 3D. FIG. 3B shows the same two objects from a different viewpoint $u_2$. From this viewpoint, object 210 occupies the x interval 212 and object 220 occupies the x interval 222. This is also shown by the two line segments at coordinate $u=u_2$ in FIG. 3D. Note that there is a shift of these segments with respect to the segments at coordinate $u=u_1$. This relative shift due to viewpoint change is called the parallax. In FIG. 3B, the two x intervals 212 and 222 are just touching. FIG. 3C shows the two objects from viewpoint $u_3$. Here, object 210 occupies the x interval 213 and object 220 occupies the x interval 223, as also shown by the two line segments at $u=u_3$ in FIG. 3D.

The two x intervals 213 and 223 are overlapping, which means that object 220 occludes part of object 210. The occluded region is the area of overlap. Repeating this process for other viewpoints u results in the two trapezoids 219 and 229 shown in FIG. 3D, which will be referred to as rays. The area of overlap 239 represents the occlusion of object 210 by object 220. Since object 220 is forward of object 210, ray 229 will be unaffected by the overlap region 239. That is, the edges of ray 229 will continue to be parallel. In contrast, ray 219 will be minus the triangular overlap region 239.

From FIG. 3D, we see an inherent line structure. That is, each point in an object creates a line in the (x,u) plane at an angle φ with respect to the normal to the x axis. A set of adjacent points at the same depth creates a ray of a certain width, which forms an angle φ with the vertical axis. These angles are labeled $φ_1$ and $φ_2$ in FIG. 3D. In the general four-dimensional case, these angles would be with respect to the normal to the (x,y) plane. For convenience, the angle φ will be referred to as the parallax angle. The parallax angle φ depends on the depth location of the object. Due to parallax, objects that are farther in depth from the viewpoint u-plane produce lines with a smaller parallax angle φ. Ray 219, which corresponds to object 213 which is farther from the u axis has a lower parallax angle φ. Ray 229, which corresponds to object 223 which is closer to the u axis, has a larger parallax angle φ. In some configurations of camera arrays or plenoptic cameras, the angle φ can also be negative. These rays correspond to objects that are located further along the direction towards the viewpoint, than objects that produce vertical rays (i.e., rays with φ=0). Generally, the angle φ can take values within the interval $(-π/2, π/2)$.

Figure 4:
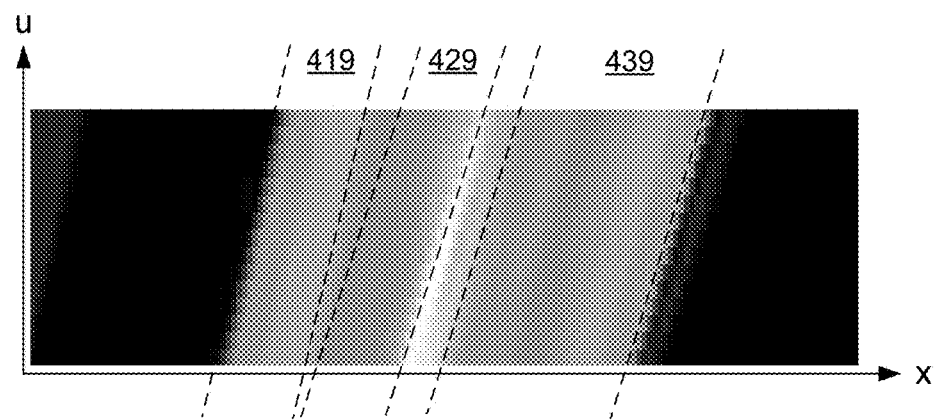
FIG. 4 shows rays superimposed on an (x,u) slice from a light field for a grayscale scene.

FIG. 4 shows an (x,u) slice from a light field for a grayscale scene. FIG. 4 also shows three rays 419, 429 and 439, of varying angle (depth) and width.

There is a direct correspondence between parallax angle φ and depth in the three-dimensional scene. As a result, the (x,u) representation of the three-dimensional scene can be transformed to the (x,φ) domain. The (φ) portion of this domain is one example of a (depth) domain due to the direct correspondence between parallax angle φ and depth.

(Scale) Domain

Returning to FIG. 3D, the width of each ray 219,229 corresponds to the spatial extent (i.e., size) of the corresponding object 210,220 in the three-dimensional scene. Objects of different sizes can be handled by using a scale space representation of the scene.

In one approach, the scale space representation of an image is obtained by convolving it with a kernel, whose scale changes from small scales (giving a narrow and sharp kernel) to large scales (giving a wide and smooth kernel). At different levels of the scale space, image features of different sizes will be smoothed differently, i.e., small features will disappear at larger scales. Therefore, the scale-space framework allows scale invariant image processing, which is useful for dealing with the object size variations in images, for example due to object pose or camera orientation and distance.

A commonly used kernel for constructing a scale space is the Gaussian kernel. A Gaussian scale space in the one-dimensional case (ignoring the viewpoint u for now) is defined as:

$$I(x,σ)=I(x)*G_σ(x) \quad (1)$$

where $$G_σ(x) = \frac{1}{σ\sqrt{2π}} e^{-\frac{x^2}{2σ^2}}, \quad (2)$$

σ is the (scale) coordinate, and * denotes the convolution operator.

Scale spaces based on the derivatives of the Gaussian kernel can also be constructed. For example, the normalized first derivative of the Gaussian scale-space:

$$I'(x, σ) = I(x) * σ \frac{dG_σ(x)}{dx} \quad (3)$$

can be used for edge-detection, where "normalized" refers to the multiplication by σ. Namely, when a given signal $I(x)=t(x-x_0)$ where $t(x)$ is a step function, we have:

$$I(x) * \frac{dG_σ(x)}{dx} = \frac{dI(x)}{dx} * G_σ(x) = δ(x-x_0) * G_σ(x) = G_σ(x-x_0). \quad (4)$$

The normalized second derivative of the Gaussian scale-space:

$$I''(x, σ) = I(x) * σ^2 \frac{d^2 G_σ(x)}{dx^2} \quad (5)$$

can be used for blob detection, where "normalized" refers to the multiplication by $σ^2$. This is because when $I(x)=t(x-x_0)-t(x-x_1)$, we have that $$I(x) * σ^2 \frac{d^2 G_σ(x)}{dx^2}$$

has a minimum for $$σ = \frac{x_0 - x_1}{2}.$$

Additional known properties of Gaussian scale space are described in the Appendix.

Figure 5A:
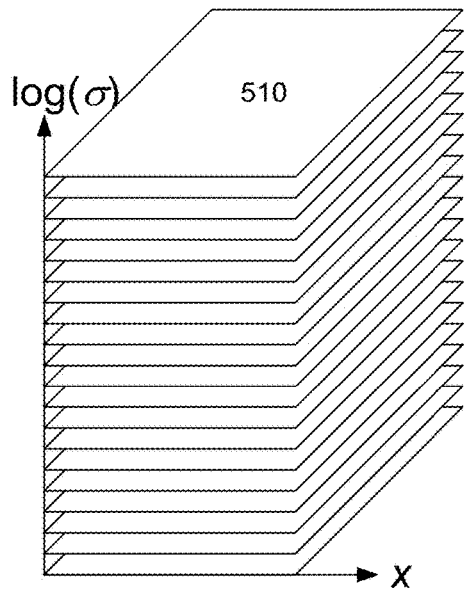
FIG. 5A illustrates a Gaussian scale space for a two-dimensional image.
Figure 5B:
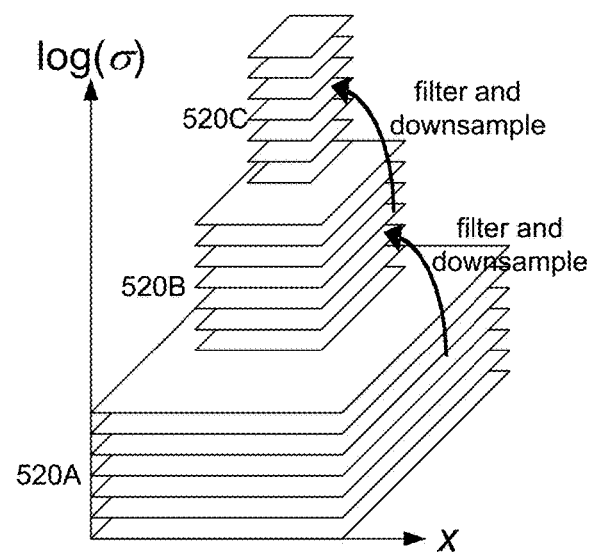
FIG. 5B is a diagram illustrating a Gaussian pyramid.

One advantage of Gaussian scale spaces is that they allow recursive scale domain implementation via a Gaussian pyramid, as shown in FIGS. 5A-5B. In FIG. 5A, element 510 represents a Gaussian scale space. The (x,y) coordinates are the image coordinates and σ is the scale coordinate. For clarity, assume scaling in only one dimension. Element 510 represents Eqn. (1), with log(σ) along the vertical axis. One way to construct element 510 is to directly calculate Eqn. (1) for different values of σ, as represented by the different "slices" in element 510.

An alternate approach is to build a Gaussian pyramid, as shown in FIG. 5B. In this case, element 520A is constructed by directly calculating Eqn. (1). Element 520B is obtained by downsampling the element 520A by a multiplicative factor, for example a factor of 2 (one octave). That is, the slices of element 520B are evaluated at values of σ that are multiples of those used for element 520A, for example multiple of 2. The slices of element 520B can be constructed by filtering and downsampling the slices of element 520A, rather than calculating them by direct application of Eqn. (1). Similarly, the slices in element 520C can be constructed by filtering and downsampling the slices of element 520B.

Transform to the (Image,Scale,Depth) Domain

Now consider a specific example of transforming from the (image,view) domain to the (image,scale,depth) domain, based on the above specifics. In this example, the captured multi-view images are represented in the (image,view) domain by $I(x,u)$. We want to transform the (image,view) domain representation $I(x,u)$ to an (image,scale,depth) domain representation $\mathcal{L}(x; \sigma, \phi)$. For convenience, $\mathcal{L}(x; \sigma, \phi)$ may also be referred to as a scale-depth transform (or scale-depth space) of $I(x,u)$.

Let us first define a kernel that we will use in the transformation. We define the Ray-Gaussian kernel as:

$$\mathcal{R}_{\sigma,\varphi}(x, u) = \frac{1}{\sigma\sqrt{2\pi}} e^{-\frac{(x+u\tan\varphi)^2}{2\sigma^2}}, \qquad (6)$$

where x and u are as defined in FIG. 2D, φ is the angle that the Ray-Gaussian kernel forms with the u-axis (i.e., angle with the normal to the x-axis) and σ is the width parameter of the kernel. The "Ray" in Ray-Gaussian refers to the rays that are present in (x,u) space.

Figure 6:
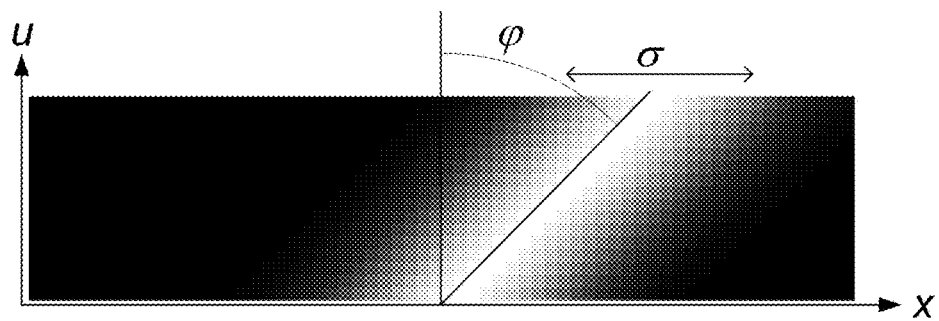
FIG. 6 shows an example of a Ray-Gaussian kernel with $\phi=\pi/4$ and $\sigma=6$.

FIG. 6 shows an example of a Ray-Gaussian function with φ=π/4 and σ=6. In this grayscale picture, the lighter pixels are higher values and the darker pixels are lower values. The Ray-Gaussian is Gaussian in the x-direction and a ridge in the u-direction. The slant of the ridge is equal to tan φ, which multiplies u in the shift of x in the exponent. This linear shift $x_0 = u \tan \phi$ is chosen here to best represent the ray structures in the (image,view) domain for light fields obtained with the uniform spacing of viewpoints on a flat plane.

Note, however, that one can also choose different (and possibly nonlinear) parameterizations of shift $x_0 = f(u)$ to represent different structures such as rays with non-linear parameterization in u, for example rays with non-zero curvature. The appropriate choice of $f(u)$ depends on the geometry of the light field image acquisition. In the example of FIG. 2, each point in the three-dimensional scene creates a line in the (image,view) slice, and points at different depths correspond to lines at different angles. However, if the multi-view images are captured by non-uniform camera arrays on non-flat planes or plenoptic cameras with non-uniform microlens array density, then location of points at different depths in the three-dimensional scene may form different curves in the (image,view) slice. The function $f(u)$ defining the parameterization of each curve is chosen accordingly.

We use the Ray-Gaussian kernel to construct the Ray-Gaussian transform $\mathcal{L}(x; \sigma, \phi)$ of $I(x,u)$, according to:

$$\mathcal{L}(x;\sigma,\phi) = (I * \mathcal{R}_{\sigma,\phi})(x,u)|_{u=0} \qquad (7)$$

where u=0 is chosen because we are evaluating convolution only over x (image domain). That is, $$(f*g)(x,u)|_{u=0} = \int_x \int_u f(x-x',-u')g(x',u')dx'du' \qquad (8)$$

Note here that $\mathcal{L}(x; \sigma, \phi)$ does not depend on u since the convolution is only over x, and that $\mathcal{L}(x; \sigma, \phi)$ has both scale σ and angle φ as parameters.

Similarly, we define the n-th derivative of the Ray-Gaussian transform as:

$$\frac{d^n}{dx^n}\mathcal{L}(x;\sigma,\varphi) = \left(I * \frac{d^n}{dx^n}\mathcal{R}_{\sigma,\varphi}\right)(x,u)\bigg|_{u=0} \qquad (9)$$

In the following, we show certain properties of the Ray-Gaussian function, which are beneficial for building the Ray-Gaussian transform. The next two Lemmas prove equalities related to scale change of the Ray-Gaussian and its downsampling or upsampling factor.

Lemma 1:
The following equality holds:

$$\mathcal{R}_{\sigma,\phi}(x,u) = s\mathcal{R}_{s\sigma,\phi}(sx,su) \qquad (10)$$

where s>0 is a scale factor.
Proof:

$$s\mathcal{R}_{s\sigma,\varphi}(sx, su) = \qquad (11)$$

$$\frac{s}{s\sigma\sqrt{2\pi}} e^{-\frac{(sx+su\tan\varphi)^2}{2s^2\sigma^2}} = \frac{1}{\sigma\sqrt{2\pi}} e^{-\frac{(x+u\tan\varphi)^2}{2\sigma^2}} = \mathcal{R}_{\sigma,\varphi}(x, u).$$

Lemma 1 shows a Ray Gaussian with scale σ and angle φ is equal to its downsampled version at scale sσ and angle φ, with values multiplied by s, for a downsampling factor s. In light fields, downsampling in u is usually undesirable since that means we are dropping some views of the scene, whose number is usually small. Therefore, we show the following Lemma that addresses downsampling only in x.

Lemma 2:
The following equality holds:

$$\mathcal{R}_{\sigma,\phi}(x,u) = s\mathcal{R}_{s\sigma,\phi'}(sx,u), \qquad (12)$$

where φ'=arctan(s tan φ), φ∈(−π/2, π/2) and s>0.
Proof: Since tan(φ')=s tan φ, we have:

$$s\mathcal{R}_{s\sigma,\varphi'}(sx, u) = \qquad (13)$$

$$\frac{s}{s\sigma\sqrt{2\pi}} e^{-\frac{(sx+u\tan\varphi')^2}{2s^2\sigma^2}} = \frac{1}{\sigma\sqrt{2\pi}} e^{-\frac{(sx+su\tan\varphi)^2}{2s^2\sigma^2}} = \mathcal{R}_{\sigma,\varphi}(x, u)$$

The second Lemma shows that a Ray Gaussian with scale σ and angle φ is equal to its downsampled version at scale sσ and angle φ'=arctan(s tan φ), with values multiplied by s, for a downsampling only in x by factor s.

Equipped with these two Lemmas, we can now show the following properties of the Ray-Gaussian transform $I * \mathcal{R}_{\sigma,\phi}$. The next six propositions are related to the behavior of the Ray-Gaussian transform with downsampling of the light field I. For completeness, proofs of these propositions are given in the Appendix.

Proposition 1:
If we have a light field slice J(x, u) such that J(x, u)=I(sx, su) (i.e., I is a downsampled or upsampled version of J), then:

$$(J * \mathcal{R}_{\sigma,\varphi})(x, u)\bigg|_{u=0} = \frac{1}{s}(I * \mathcal{R}_{s\sigma,\varphi})(sx, su)\bigg|_{su=0} \qquad (14)$$

Proposition 2:
If we have a light field slice J(x, u) such that J(x, u)=I(sx, u) (i.e., I is a downsampled or upsampled version of J only over x), then:

$$(J * \mathcal{R}_{\sigma,\phi})(x,u)|_{u=0} = (I * \mathcal{R}_{s\sigma,\phi'})(sx,u)|_{u=0} \qquad (15)$$

where ϕ'=arctan(s tan ϕ), ϕ ∈ (−π/2, π/2) and s>0.

These two properties of the Ray-Gaussian transform indicate that we can build the transform $\mathcal{L}$(x; σ,ϕ) of light field I in several ways. FIG. 7A shows a direct approach. In this approach, I is convolved 710 with $\mathcal{R}_{\sigma,\phi}$, for σ ∈ $\{\sigma_1, \ldots, \sigma_n, 2\sigma_1, \ldots, 2\sigma_n, \ldots, 2^k\sigma_1, \ldots, 2^k\sigma_n\}$ and for ϕ ∈ $\{\phi_1, \ldots, \phi_m\}$. In this formulation, n is the number of samples per octave of scale and (k+1) is the number of octaves, and m is the number of samples in the depth domain. The downsampling factor is chosen as 2, although other factors p could also be used. In FIG. 7A this is implemented by two loops 722, 724.

FIG. 7B uses the propositions above to reduce the amount of computation by downsampling and forming a pyramid similar to the one in FIG. 5B. This can be especially useful for large light fields. In this approach, I is convolved with $\mathcal{R}_{\sigma,\phi}$, for σ ∈ $\{\sigma_1, \ldots, \sigma_n\}$ and for ϕ ∈ $\{\phi_1, \ldots, \phi_m\}$, as indicated by loops 722 and 726 in FIG. 7B. Note that the values of σ span less than an octave, which is much less compared to FIG. 7A. I is then downsampled 730 by 2, and the down-sampled I is multiplied by 2 (according to Eq. (14)) and convolved with $\mathcal{R}_{\sigma,\phi}$, for σ ∈ $\{\sigma_1, \ldots, \sigma_n\}$ and for ϕ ∈ $\{\phi_1, \ldots, \phi_m\}$. This convolution requires less computation because I has been down-sampled. This is repeated (k−1) times in loop 732.

FIG. 7C is similar to FIG. 7B, except that the downsampling 737 occurs only in x and not in u. In that case, for each downsampling, the depth values ϕ are also changed 737. That is, after downsampling, the down-sampled I is convolved with $\mathcal{R}_{\sigma,\phi}$, for σ ∈ $\{\sigma_1, \ldots, \sigma_n\}$ and for ϕ ∈ $\{\phi'_1, \ldots, \phi'_m\}$.

We can also show that similar properties hold for transforms built upon the first and second derivatives of the Ray-Gaussian.

Proposition 3:

If we have a light field slice J(x, u) such that J(x, u)=I(sx, su) (i.e., I is a downsampled or upsampled version of J), then:

$$\left(J * \sigma \frac{d}{dx}\mathcal{R}_{\sigma,\varphi}\right)(x,u)\bigg|_{u=0} = \frac{1}{s}\left(I * s\sigma \frac{d}{dx}\mathcal{R}_{s\sigma,\varphi}\right)(sx, su)\bigg|_{su=0} \quad (16)$$

Proposition 4:

If we have a light field slice J(x, u) such that J(x, u)=I(sx, u) (i.e., I is a downsampled or upsampled version of J only over x), then:

$$\left(J * \sigma \frac{d}{dx}\mathcal{R}_{\sigma,\varphi}\right)(x,u)\bigg|_{u=0} = \left(I * s\sigma \frac{d}{dx}\mathcal{R}_{s\sigma,\varphi'}\right)(sx, u)\bigg|_{u=0} \quad (17)$$

where ϕ'=arctan(s tan ϕ), ϕ∈(−π/2, π/2) and s>0.

We can see from Propositions 3 and 4 that for construction of first derivative Ray-Gaussian transforms $\mathcal{L}$'(x; σ, ϕ), we can use the "normalized" Ray-Gaussian derivative $$\mathcal{R}'_{\sigma,\varphi} = \sigma \frac{d}{dx}\mathcal{R}_{\sigma,\varphi}$$

to implement approaches similar to those shown in FIGS. 7A-7C.

Proposition 5:

If we have a light field slice J(x, u) such that J(x, u)=I(sx, su) (i.e., I is a downsampled or upsampled version of J), then:

$$\left(J * \sigma^2 \frac{d^2}{dx^2}\mathcal{R}_{\sigma,\varphi}\right)(x,u)\bigg|_{u=0} = \frac{1}{s}\left(I * s^2\sigma^2 \frac{d^2}{dx^2}\mathcal{R}_{s\sigma,\varphi}\right)(sx, su)\bigg|_{su=0} \quad (18)$$

Proposition 6:

If we have a light field slice J(x, u) such that J(x, u)=I(sx, u) (i.e., I is a downsampled or upsampled version of J only over x), then:

$$\left(J * \sigma^2 \frac{d^2}{dx^2}\mathcal{R}_{\sigma,\varphi}\right)(x,u)\bigg|_{u=0} = \left(I * s^2\sigma^2 \frac{d^2}{dx^2}\mathcal{R}_{s\sigma,\varphi'}\right)(sx, u)\bigg|_{u=0} \quad (19)$$

where ϕ'=arctan(s tan ϕ), ϕ∈(−π/2, π/2) and s>0.

Similarly, we can see from Propositions 5 and 6 that for construction of second derivative Ray-Gaussian transforms $\mathcal{L}$"(x; σ, ϕ), we can use the "normalized" Ray-Gaussian second derivative:

$$\mathcal{R}''_{\sigma,\varphi} = \sigma \frac{d^2}{dx^2}\mathcal{R}_{\sigma,\varphi}$$

to implement approaches similar to those shown in FIGS. 7A-7C.

It is useful to show one more property of the Ray-Gaussian kernel, which relates to the preservation of the inner product with a light field under change of angles.

Proposition 7:

If we have a light field that satisfies I(x, u)=f(x−au), where a is a constant (which is the case when there are no occlusions), then:

$$\langle f(x-u\tan\phi_1)\mathcal{R}_{\sigma,\phi_1}(x,u)\rangle = \langle f(x-u\tan\phi_2)\mathcal{R}_{\sigma,\phi_2}(x,u)\rangle. \quad (20)$$

Similar propositions hold for the derivatives $\mathcal{R}'_{\sigma,\phi}$ and $\mathcal{R}''_{\sigma,\phi}$. This is an important property for depth estimation because it assures that there is no bias with respect to the angle of rays and thus no bias with respect to depth values.

Depth Estimation from Normalized Second Derivative Ray-Gaussian Transform.

Returning to FIG. 2, the scale-depth transform can be processed 290 in different ways to achieve different purposes. In one application, the (image,scale,depth) domain representation of the three-dimensional scene is processed to estimate depth in the three-dimensional scene. The following example is based on detecting rays in (x,u) space along with their position in the slice, their width (based on σ) and their angle (based on ϕ).

FIG. 8 shows a flow diagram for achieving this based on the Ray-Gaussian transform. FIG. 8 is an example of the process shown in FIG. 2. Here, the transformation step 880 is based on the normalized second derivative Ray Gaussian transform $\mathcal{L}$"(x; σ; ϕ)=(I*$\mathcal{R}$"$_{\sigma,\phi}$)(x, u)|$_{u=0}$. The processing step 890 is based on finding extrema (local minima and maxima) of $\mathcal{L}$"(x; σ, ϕ). The parameters of extrema points $\{(x_p, \sigma_p, \phi_p)\}$ give the following information about each ray p:

position of the center of the ray $x_p$ width of the ray $2\sigma_p$ angle of the ray $\phi_p$, From the angle $\phi_p$ we can get the depth $d_p$ of that ray (i.e., depth of the corresponding points in the three-dimensional scene) by using the camera calibration parameters as $d_p = fb/\tan(\phi_p)$, where $f$ is camera focal length and b is inter-camera distance. For plenoptic cameras, we can evaluate a more precise angle-depth value assignment by simulating the plenoptic image formation using ray tracing or wave propagation. This second approach encompasses a more precise use of optical parameters in depth estimation.

After we have detected the rays and found their parameters, we can further refine the results by applying additional techniques. One technique resolves occlusion conflicts 892 between overlapping rays. Since we have the position and width for each ray, we can find sets of rays that overlap, such as shown in FIG. 3D. Once we have found overlapping rays, we can decide the ordering of rays from the foreground to the background. Because larger angle of rays indicates smaller depth (closer objects, larger parallax), rays with larger angles should be in the foreground as shown in FIG. 9A. In FIG. 9A, ray 910 occludes ray 920 in (x,u) space. This is possible because ray 910 is at a steeper angle, meaning that it is closer to the camera and it makes sense for a closer object to occlude a farther object.

Due to noise in the images, detected rays sometimes conform to the situation presented in FIG. 9B. In this example, ray 920 occludes ray 910, but ray 920 represents a farther object. One approach for handling such cases with overlapping rays is to remove the "occluded" ray 910 from the set of all rays. For situations conforming to FIG. 9A, we keep the rays and we can additionally record the information about the occlusion.

We can assign depth 894 to pixels by combining information from detected rays that remained after the occlusion detection 892. We can also combine information from rays detected by processing scale-depth spaces from (x,u) slices and scale-depth spaces from (y,v) slices of the light field. Slices (x,u) correspond to views with horizontal parallax and slices (y,v) correspond to views with vertical parallax. For pixels with multiple options for assignment (i.e., multiple rays), we may choose the assignment with a higher confidence value. All other factors being equal, we pick the ray with the highest absolute value of the scale-depth space for that pixel.

The dashed lines in FIG. 8 denote an additional processing path to detect edges and their angles in the three-dimensional scene. This will be described in more detail below. This information can also be used to improve the depth assignment. For example, we can combine confidence values from ray detection and edge detection to obtain better depth assignments. We can also eliminate weak rays that do not have sharp edges on both sides, as those may be erroneous.

3D Feature Detection from First Derivative Ray-Gaussian Transform

We can detect edges in three-dimensional scenes and estimate depth values for those edges by finding extrema in the normalized first derivative Ray Gaussian transform $\mathcal{L}'(x; \sigma, \phi) = (I * \mathcal{R}'_{\sigma,\phi})(x, u)|_{u=0}$. The parameters of extrema points $\{(x_q, \sigma_q, \phi_q)\}$ give us the following information about each edge q:

position of the edge $x_q$
scale of the edge $\sigma_q$
angle of the edge $\phi_q$ Edges are usually informative image features. Since we get a depth value assigned to each edge feature, our method effectively performs 3D feature detection. A flowchart of an edge feature detection method is shown in the dashed boxes of FIG. 8. This is another example of the process shown in FIG. 2. Here, the transformation step 980 is based on the normalized first derivative Ray Gaussian transform $\mathcal{L}'(x; \sigma, \phi) = (I * \mathcal{R}'_{\sigma,\phi})(x, u)|_{u=0}$. The processing step 990 is based on finding extrema (local minima and maxima) of $\mathcal{L}'(x; \sigma, \phi)$. Occlusion detection 992 can also be applied to edge detection.

The approach shown in the dashed boxes of FIG. 8 can be generalized for other types of feature detection. The processing step 990 would be replaced with different processing, depending on the desired feature detection. For example, we can also look for corners as image features, by finding extrema in the 4D volume of concatenated scale-depth transforms, where the concatenation is along the second image dimension y.

Experimental Results

Figure 10A:
FIG. 10A is one image from a set of light field images.

We have evaluated depth estimation and 3D feature detection methods on the "truck" light field from the Stanford database. This is a (x, y, u, v) light field obtained with a camera gantry and it contains images with both horizontal and vertical camera displacements. There are in total 16×16 images. The grayscale version of one image is shown in FIG. 10A. The following results are shown for grayscale versions of the light field, but the approaches described here can also be used to aggregate results from multiple color channels.

Figure 10B:
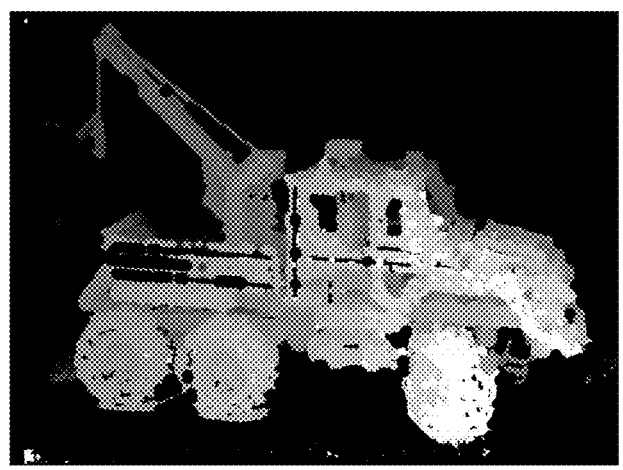
FIG. 10B shows depth estimation for the set of light field images.
Figure 10C:
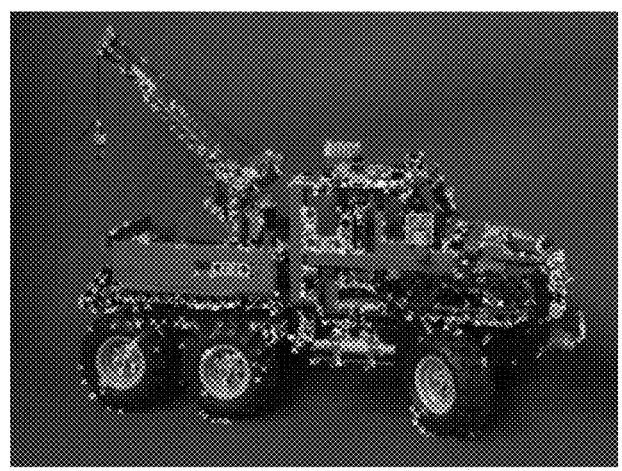
FIG. 10C shows feature extraction for the set of light field images.

We have applied the Ray-Gaussian transform, ray detection and edge detection separately for (x,u) and (y,v) slices and then combined them prior to depth assignment. For depth map estimation, we have used information both from ray detection and edge detection. The obtained depth map, after some post processing (median filtering and morphological closing) is shown in FIG. 10B. In FIG. 10B, lighter grayscales represent closer depths, and darker grayscales represent farther depths. Finally, FIG. 10C shows positions of detected 3D features overlaid on the original color image. The depth of each feature is indicated by the pseudo-color of the feature marker. Hotter (redder) colors indicate closer features and cooler (bluer) colors indicate farther features.

Higher Dimension Ray-Gaussian Transforms

The examples described above are based on Ray-Gaussian kernels defined over two dimensions. The two dimensions are typically an (image) dimension such as x, and the corresponding (view) dimension such as u. The Ray Gaussian transform then includes a convolution over one image dimension, such as x. In the above example, derivatives are used to detect edges oriented along one dimension. As described above, the Ray-Gaussian kernels can be defined over more than two dimensions. For example, while edges vary primarily along one dimension, corners or other types of "blobs" vary in two dimensions. Therefore, Ray-Gaussian kernels defined in three dimensions and involving convolution over both x and y can be used to detect blobs. An example is the Ray-Gaussian kernel $$\mathcal{R}_{\sigma_x, \sigma_y, \varphi}(x, y, u) = \frac{1}{2\pi\sigma_x\sigma_y} e^{-\frac{(x - u \tan \varphi)^2}{2\sigma_x^2} - \frac{y^2}{2\sigma_y^2}} \quad (21)$$

This kernel is similar to the kernel for Eqn. (6) except that it involves two (image) dimensions x and y, instead of just one (image) dimension x. $\sigma_x$ and $\sigma_y$ are the corresponding width (scale) parameters of the kernel, u is the (view) dimension and p is the angle that the Ray-Gaussian kernel forms with the u-axis. The choice of u as the (view) dimension is arbitrary. The (view) dimension v could have been used instead, with φ then defined as the angle that the Ray-Gaussian kernel forms with the v-axis.

Figure 12:
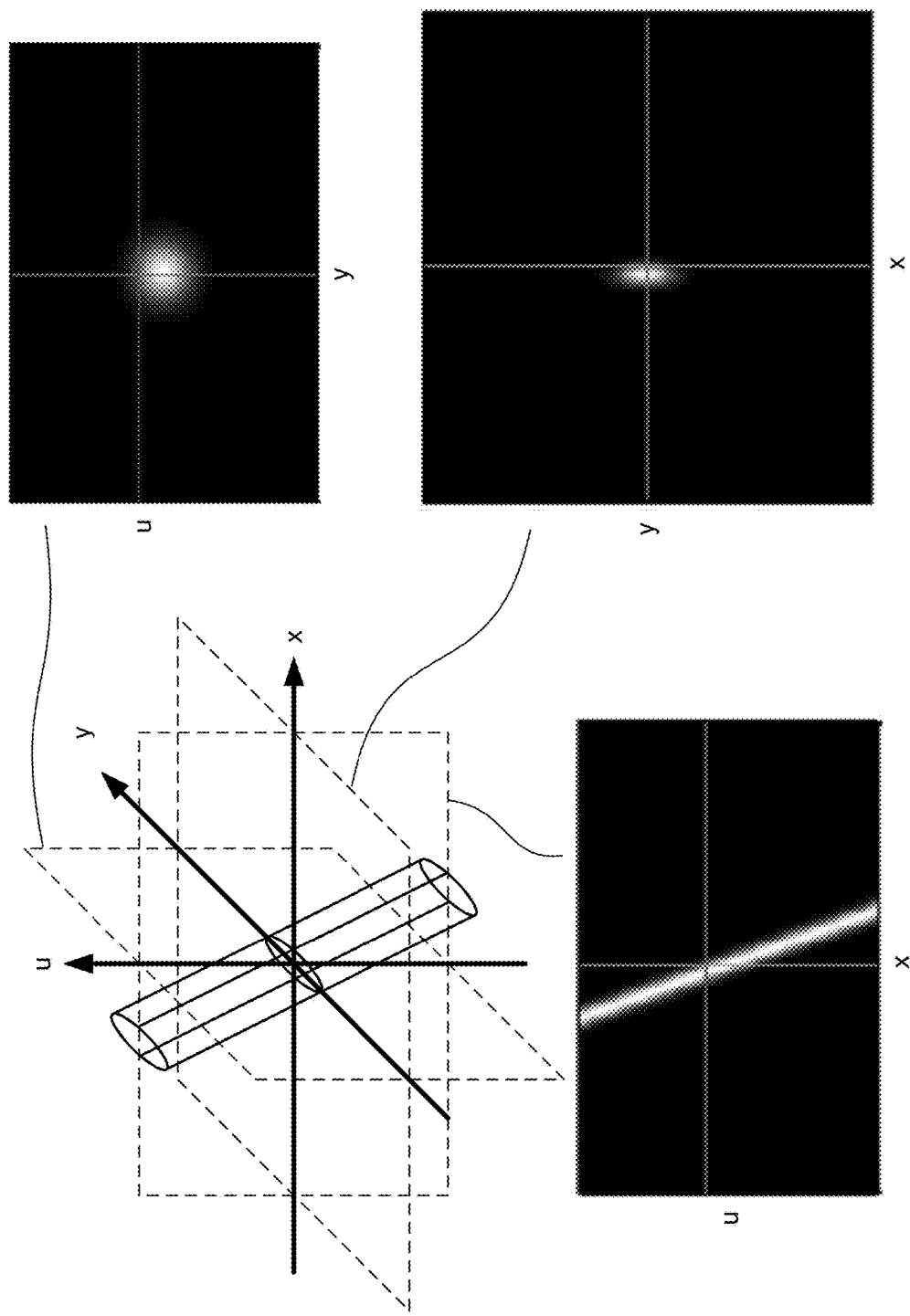
FIG. 12 shows an example of a three-dimensional Ray-Gaussian kernel.

FIG. 6 showed an example of a two-dimensional Ray-Gaussian kernel according to Eqn. (6). FIG. 12 shows an example of a three-dimensional Ray-Gaussian kernel according to Eqn. (21). FIG. 12 shows a black and white perspective drawing that depicts the Ray-Gaussian kernel as a tilted cylinder 1210 of elliptical cross-section. However, the perspective drawing does not show the analog nature of the kernel. FIG. 12 also includes two-dimensional grayscale cross-sections of the Ray-Gaussian kernel, which show the analog nature of the kernel.

We can detect blobs or other keypoints and features by using derivatives of the higher dimension Ray Gaussian transform. In one approach, blob detection is based on the Hessian matrix of the three-dimensional Ray Gaussian transform. The Hessian matrix can be defined as $$\mathcal{H} = \begin{bmatrix} \mathcal{L}''_{xx} & \mathcal{L}''_{xy} \\ \mathcal{L}''_{xy} & \mathcal{L}''_{yy} \end{bmatrix} \quad (22)$$

where $$\mathcal{L}''_{xx}(x, y; \sigma_x, \sigma_y, \varphi) = \left(I * \sigma_x^2 \frac{\partial^2}{\partial x^2} \mathcal{R}_{\sigma_x, \sigma_y, \varphi}\right)(x, y, u)\Big|_{u=0}$$

$$\mathcal{L}''_{xy}(x, y; \sigma_x, \sigma_y, \varphi) = \left(I * \sigma_x \sigma_y \frac{\partial^2}{\partial x \partial y} \mathcal{R}_{\sigma_x, \sigma_y, \varphi}\right)(x, y, u)\Big|_{u=0}$$

$$\mathcal{L}''_{yy}(x, y; \sigma_x, \sigma_y, \varphi) = \left(I * \sigma_y^2 \frac{\partial^2}{\partial y^2} \mathcal{R}_{\sigma_x, \sigma_y, \varphi}\right)(x, y, u)\Big|_{u=0}$$

The second-order derivatives of the Ray Gaussian transform, using the three dimensional Ray Gaussian kernel, can now be constructed using a partial derivative over x, a partial derivative over y or a cross partial derivative over x and y. These are denoted as $\mathcal{L}''_{xx}(x,y; \sigma_x, \sigma_y, \varphi)$, $\mathcal{L}''_{yy}(x,y; \sigma_x, \sigma_y, \varphi)$ and $\mathcal{L}''_{xy}(x,y; \sigma_x, \sigma_y, \varphi)$, respectively. Similarly as described above, the second-order partial derivative Ray Gaussian transforms $\mathcal{L}''_{xx}$, $\mathcal{L}''_{yy}$ and $\mathcal{L}''_{xy}$ are computed using normalized derivatives of the 3D Ray Gaussians, where the normalization is done by multiplying 3D Ray Gaussian with $\sigma_x^2$, $\sigma_y^2$ and $\sigma_x \sigma_y$, respectively.

Propositions 5 and 6 above can also be straightforwardly extended to the (x,y,u) domain, to yield Propositions 5A and 6A below. The proofs are straightforward, following the same logic as for Propositions 5 and 6. Note that the scales $s_x$ and $s_y$ can be different, but the scale for (view) coordinate u is the same as the scale in x, i.e. $s_x$. This is because the (view) coordinate u is related to x in the definition of the Ray Gaussian (in exponent). If we used the domain (x,y,v), then the scale for v would be $s_y$ and the 3D Ray Gaussian would use (y-v tan φ) in the exponent. In the simulations below, we use a special case where $s_x = s_y$.

Proposition 5A:

If we have a light field slice J(x,y, u) such that J(x,y, u)=I ($s_x$x, $s_y$y, $s_x$u) (i.e., I is a downsampled or upsampled version of J), then:

$$\left(J * \sigma_x^2 \frac{\partial^2}{\partial x^2} \mathcal{R}_{\sigma_x, \sigma_y, \varphi}\right)$$

$$(x, y, u)\big|_{u=0} = \frac{1}{s_x}\left(I * s_x^2 \sigma_x^2 \frac{\partial^2}{\partial x^2} \mathcal{R}_{s_x \sigma_x, s_y \sigma_y, \varphi}\right)(s_x x, s_y y, s_x u)\big|_{s_x u=0}$$

$$\left(J * \sigma_x \sigma_y \frac{\partial^2}{\partial x \partial y} \mathcal{R}_{\sigma_x, \sigma_y, \varphi}\right)(x, y, u)\big|_{u=0} =$$

$$\frac{1}{s_x}\left(I * s_x s_y \sigma_x \sigma_y \frac{\partial^2}{\partial x \partial y} \mathcal{R}_{s_x \sigma_x, s_y \sigma_y, \varphi}\right)(s_x x, s_y y, s_x u)\big|_{s_x u=0}$$

$$\left(J * \sigma_y^2 \frac{\partial^2}{\partial y^2} \mathcal{R}_{\sigma_x, \sigma_y, \varphi}\right)(x, y, u)\big|_{u=0} = \frac{1}{s_x}\left(I * s_y^2 \sigma_y^2 \frac{\partial^2}{\partial y^2} \mathcal{R}_{s_x \sigma_x, s_y \sigma_y, \varphi}\right)$$

$$(s_x x, s_y y, s_x u)\big|_{s_x u=0}$$

Proposition 6A:

If we have a light field slice J(x,y,u) such that J(x,y, u)=I($s_x$x, $s_y$y, u) (i.e., I is a downsampled or upsampled version of J only over (x,y)), then $$\left(J * \sigma_x^2 \frac{\partial^2}{\partial x^2} \mathcal{R}_{\sigma_x, \sigma_y, \varphi}\right)(x, y, u)\big|_{u=0} =$$

$$\left(I * s_x^2 \sigma_x^2 \frac{\partial^2}{\partial x^2} \mathcal{R}_{s_x \sigma_x, s_y \sigma_y, \varphi'}\right)(s_x x, s_y y, u)\big|_{u=0}$$

$$\left(J * \sigma_x \sigma_y \frac{\partial^2}{\partial x \partial y} \mathcal{R}_{\sigma_x, \sigma_y, \varphi}\right)(x, y, u)\big|_{u=0} =$$

$$\left(I * s_x s_y \sigma_x \sigma_y \frac{\partial^2}{\partial x \partial y} \mathcal{R}_{s_x \sigma_x, s_y \sigma_y, \varphi'}\right)(s_x x, s_y y, u)\big|_{u=0}$$

$$\left(J * \sigma_y^2 \frac{\partial^2}{\partial y^2} \mathcal{R}_{\sigma_x, \sigma_y, \varphi}\right)(x, y, u)\big|_{u=0} = \left(I * s_y^2 \sigma_y^2 \frac{\partial^2}{\partial y^2} \mathcal{R}_{s_x \sigma_x, s_y \sigma_y, \varphi'}\right)$$

$$(s_x x, s_y y, u)\big|_{u=0}$$

where φ'=arctan($s_x$ tan φ), φ∈(−π/2, π/2) and $s_x$>0.

Figure 13:
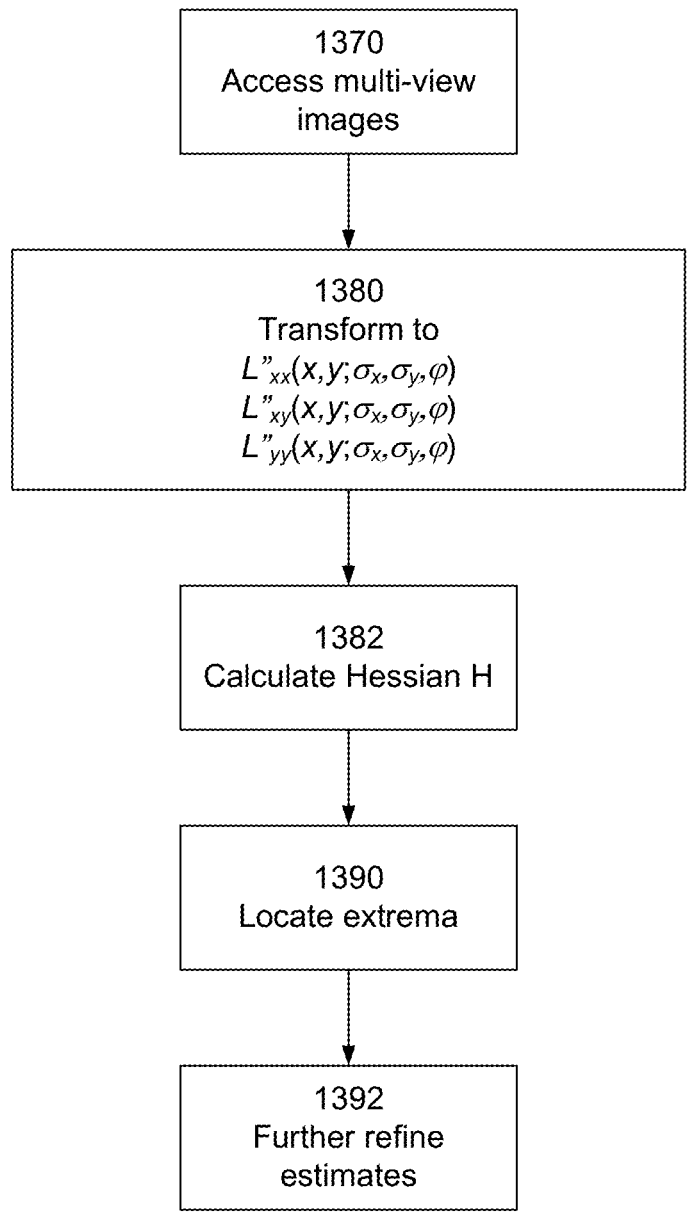
FIG. 13 is a flow diagram illustrating depth and feature estimation.

FIG. 13 shows a flow diagram for detecting blobs by finding the extrema (local minima and maxima) of the determinant of the normalized Hessian. This is another example of the process shown in FIG. 2, which begins with the multi-view images 1370. In FIG. 13, the transformation step 1380 is based on the normalized second-order partial derivative Ray Gaussian transforms, with derivatives over x, y and cross-derivative x-y. Extrema points for the determinant of the Hessian 1382 are located 1390. The parameters of the extrema points $\{(x_q, y_q, \sigma x_q, \sigma y_q, \varphi_q)\}$ give us the following information about each blob q:

(x,y) location of the blob $(x_q, y_q)$ (x,y) scale of the blob $(\sigma x_q, \sigma y_q)$ ray angle of the blob $\varphi_q$, which can be converted to depth Blob-like features are usually informative image features. Since we get a depth value assigned to each blob feature, our method effectively performs 3D feature detection. Additional processing steps 1392 can be used to refine the blob extraction.

Experimental Results

Figure 14A:
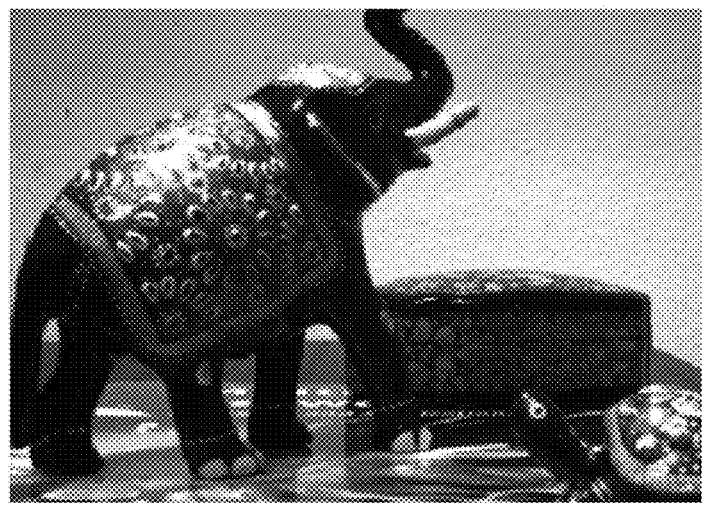
FIG. 14A is one image from a set of light field images.
Figure 14B:
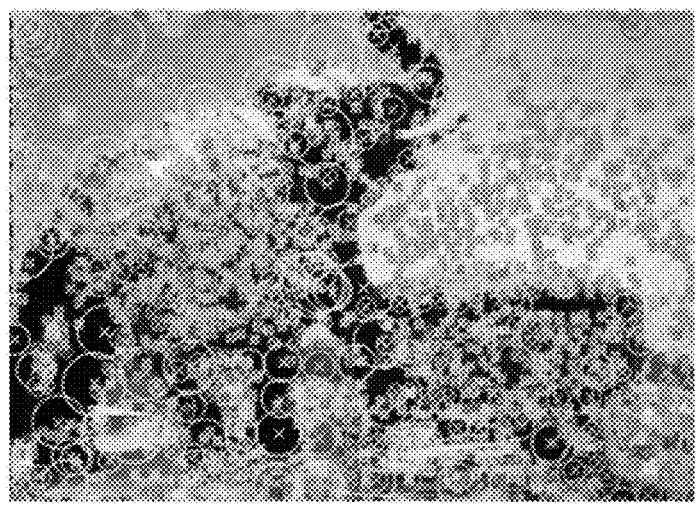
FIG. 14B shows initial feature extraction for the set of light field images.

We have applied the 3D feature detection described above on light field data obtained in the lab, using a working plenoptic camera. The middle, extracted view from the light field is shown in FIG. 14A. FIG. 14B shows the middle view images with overlaid features detected as described above. The color of each feature indicates depth of that feature (warmer colors denote closer features), while the size of the circle denotes the scale of that feature (larger circle means larger scale). The following results are shown for grayscale versions of the light field, but the approaches described here can also be used to aggregate results from multiple color channels.

We have applied the normalized second-order partial derivative Ray-Gaussian transforms, and detection of blobs based on the determinant of the Hessian. The result immediately after filtering based on the determinant of the Hessian is shown in FIG. 14B. Each x in FIG. 14B denotes a detected blob. The circle size denotes the scale and the color denotes the depth. Further processing is used to reduce the number of features. For example, some detected features may have a large determinant because they are located on edges but are not well localized. In one approach, we keep the features that are more corner-like and discard those that are more edge-like. In one approach, this is achieved by using the criteria $$\frac{\text{trace}(\mathcal{H})^2}{\det(\mathcal{H})} < \text{threshold} \quad (23)$$

Figure 14C:
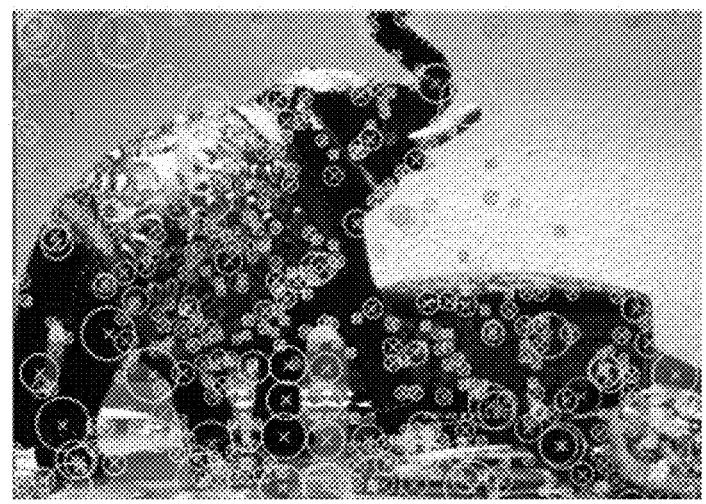
FIG. 14C shows further feature extraction for the set of light field images.

An alternate approach uses the criteria $$R = \det(\mathcal{H}) - k \cdot \text{trace}(H)^2 \quad (24)$$

where R>0 indicates a feature is a corner and R<0 indicates the feature is an edge. Features that are close to each other may be removed, for example leaving only the strongest feature. Features that are outside the expected depth range can also be removed. FIG. 14C shows the result after this additional processing using the criteria of Eqn. (23) and after removing features that are outside a predefined depth range.

Plenoptic Imaging System

Figure 11:
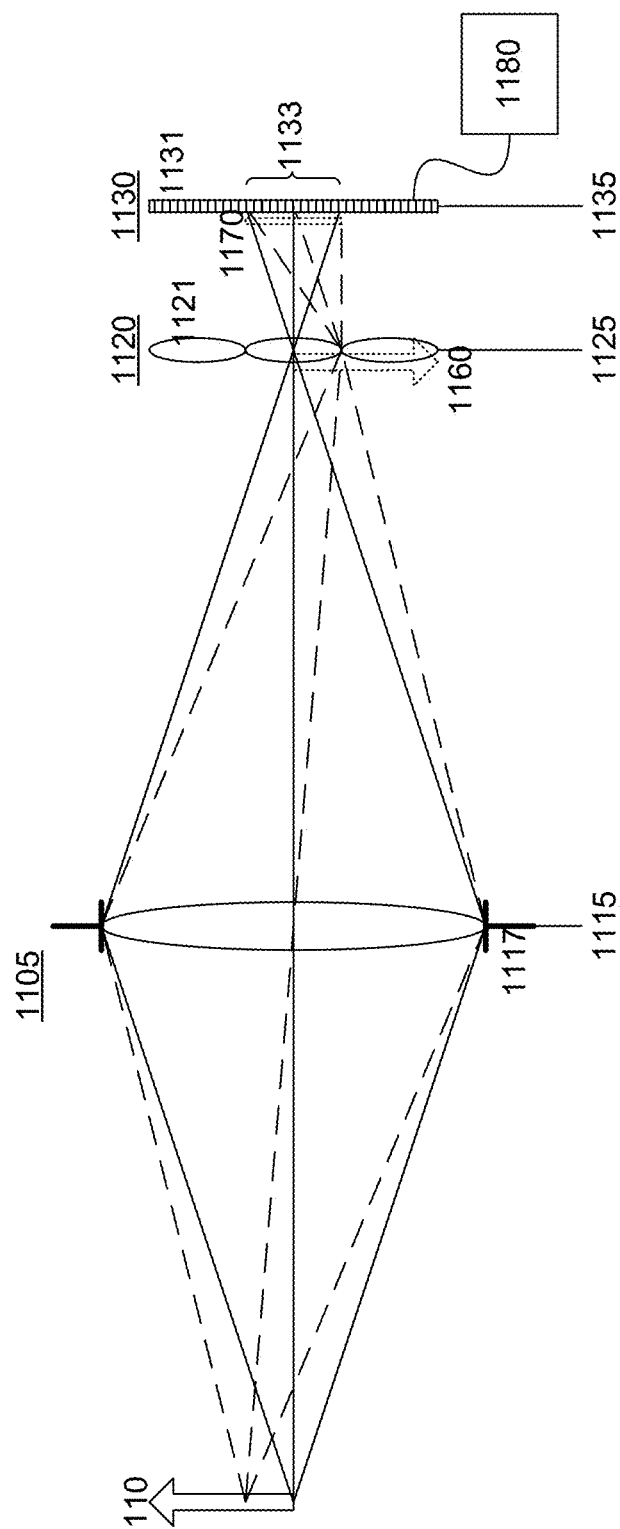
FIG. 11 is a diagram of a plenoptic imaging system.

FIG. 11 is a diagram of a plenoptic imaging system capable of capturing light field images suitable for use with the approaches described above. The system captures a plenoptic image of the scene 110. The plenoptic image is inherently a multi-view image of the scene 110. The plenoptic imaging system includes an image-forming optical module 1105, which in FIG. 11 is represented by a single lens element although it is understood that the optical module 1105 could contain multiple elements and/or non-lens elements (e.g., mirrors). The optical module 1105 forms a conventional optical image 1160 of scene 110. The optical module 1105 may also be referred to as the primary imaging module, subsystem or system. The optical image 1160 is formed at an image plane 1125 of the optical module 1105. The optical module 1105 is characterized by a pupil 1117 and pupil plane 1115, which in FIG. 11 is represented by a physical aperture stop co-located with the single lens element. In more complex optical modules 1105, the pupil 1117 and pupil plane 1115 need not be co-located with any of the optical elements within the optical module.

In a conventional imaging system, a detector array would be located at image plane 1125 to capture the optical image 1160. However, this is not the case for the plenoptic imaging system in FIG. 11. In this particular example, an array 1120 of micro-imaging elements 1121 is located at the image plane 1125. In FIG. 11, the micro-imaging elements 1121 are shown as microlenses. Other elements can also be used, for example, an array of pinholes. The detector array 1130 is located behind (i.e., optically downstream of) the micro-imaging array 1120. More specifically, the detector array 1130 is positioned in a conjugate plane 1135 to the pupil plane 1115. That is, each micro-imaging element 1121 creates an image of the pupil plane 1115 at the conjugate plane 1135, which image is captured by the detector array 1130.

In the case of microlenses, each microlens 1121 forms an image 1170 of the pupil at the detector plane 1135. The image of the pupil is captured by a subset of detectors 1131 in the detector array 1130. Each microlens 1121 forms its own image 1170. Thus, the overall plenoptic image formed at detector plane 1135 will include an array of images 1170, one for each microlens 1121. This arrayed imaging effectively subdivides the detector array into superpixels 1133, each of which contains multiple detectors 1131. Each microlens 1121 images the pupil onto the corresponding superpixel 1133, with each pupil image then captured by detectors in the corresponding superpixel.

Each detector 1131 collects the rays that travel through a portion of the pupil 1117. Each microlens 1121 collects the rays that originate from a portion of the scene 110. Thus, each detector 1131 collects the rays traveling in a certain direction from a portion of the scene 110. That is, each detector 1131 collects a small portion of the overall image of the scene, as taken from a specific viewpoint. By aggregating the data collected by detectors 1131 which are operating from the same viewpoint, a complete image of the scene from that viewpoint can be constructed. By aggregating all the images from different viewpoints, a complete light field for the scene can be constructed. In FIG. 11, a processor 1180 collects the data from the detector array 1130 and processes it accordingly. Processor 1180 may also perform the LF transform and other processing described above.

FIG. 11 shows the capture of a light field by a plenoptic imaging system. As mentioned previously, other types of light field imaging systems can also be used, for example camera arrays.

Many plenoptic cameras have particular optical properties that result in specific structure of light fields obtained from these cameras. This structure is reflected in a deterministic relation between scale and angle of rays in the (image,view) domain of the light field. For example, plenoptic cameras with a main lens focused far away (e.g. at the "hyperfocal distance" of the lens) produce light fields where rays characterized by a small parallax angle have small blur (or no blur) and rays characterized by larger parallax angles have larger blur. Since blur (smoothness) affects the level of scale at which the ray is detected through scale-depth processing, there is a deterministic relation between depth and scale. These type of relations can be advantageously exploited for reducing the complexity of search through the (image,scale,depth) space. For example, if there is a one-to-one relation between scale and depth given by a function f, the three-dimensional search within the (image,scale,depth) space can be reduced to a two-dimensional search within (image,f(scale,depth)). This can be exploited in both examples of application to depth estimation and 3D feature detection, as well as in other applications of scale-depth processing.

In the case that the main lens is focusing at an object closer than the hyperfocal distance, light field containing objects closer than the focusing distance are characterized by rays with larger parallax angles and larger blur. Objects further then the focusing distance are characterized by larger negative parallax angles and larger blur.

Although the detailed description contains many specifics, these should not be construed as limiting the scope of the invention but merely as illustrating different examples and aspects of the invention. It should be appreciated that the scope of the invention includes other embodiments not discussed in detail above. For example, light fields can be captured by systems other than plenoptic imaging systems, such as multi-aperture optical systems (a system with multiple lenses and one sensor array) or camera arrays with non-regular arrangements of cameras. As another example, the scale-depth light field transform can be processed for purposes other than the specific examples given above: segmentation, compression, object detection and recognition, object tracking, and 3D scene visualization to name a few. As a final example, the scale space can be constructed using kernels other than the Gaussian kernel described above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a non-transitory machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

APPENDIX

Properties of One-Dimensional Gaussian Kernels (Prior Art)

The following properties are shown for one-dimensional Gaussian kernels. The extension to two or more dimensions is straightforward. For one-dimensional Gaussian kernels, we have that:

$$G_\sigma(x) = \frac{1}{\sigma\sqrt{2\pi}} e^{-\frac{x^2}{2\sigma^2}} = \frac{s}{s\sigma\sqrt{2\pi}} e^{-\frac{s^2 x^2}{2s^2\sigma^2}} = sG_{s\sigma}(sx) \quad (25)$$

Define $J(x)=I(sx)$. It then holds that:

$$(J*G_\sigma)(x)=(I*G_{s\sigma})(sx) \quad (26)$$

For the first derivative, it holds:

$$\left(J*\sigma\frac{dG_\sigma(x)}{dx}\right)(x) = \left(I*s\sigma\frac{dG_{s\sigma}}{dx}\right)(sx) \quad (27)$$

For the second derivative, it holds:

$$\left(J*\sigma^2\frac{d^2 G_\sigma(x)}{dx^2}\right)(x) = \left(I*s^2\sigma^2\frac{d^2 G_{s\sigma}}{dx^2}\right)(sx). \quad (28)$$

In addition, the following are proofs of propositions 1-6 (Eqns. (14-19) above.

Proof of Proposition 1:

$$(J*\mathcal{R}_{\sigma,\varphi})(x,u)|_{u=0} = \int_{x'}\int_{u'} \mathcal{R}_{\sigma,\varphi}(x-x',-u')J(x',u')dx'du'$$

$$= \int_{x'}\int_{u'} s\mathcal{R}_{s\sigma,\varphi}(sx-sx',-su')$$

$I(sx',su')dx'du'$ (using Lemma 1)

$$= \int_w\int_v s\mathcal{R}_{s\sigma,\varphi}(sx-w,-v)I(w,v)\frac{dw}{s}\frac{dv}{s}$$

$(w=sx', v=su')$ $$= \frac{1}{s}(I*\mathcal{R}_{s\sigma,\varphi})(sx,su)|_{su=0}.$$

Proof of Proposition 2:

$$(J*\mathcal{R}_{\sigma,\varphi})(x,u)|_{u=0} = \int_{x'}\int_{u'} \mathcal{R}_{\sigma,\varphi}(x-x',-u')J(x',u')dx'du'$$

$$= \int_{x'}\int_{u'} s\mathcal{R}_{s\sigma,\varphi'}(sx-sx',-u')$$

$I(sx',u')dx'du'$ (using Lemma 2)

$$= \int_w\int_{u'} s\mathcal{R}_{s\sigma,\varphi'}(sx-w,-u')I(w,u')\frac{dw}{s}du'$$

$(w=sx')$ $$= (I*\mathcal{R}_{s\sigma,\varphi'})(sx,u)|_{u=0}$$

Proof of Proposition 3:

$$\left(J*\sigma\frac{d}{dx}\mathcal{R}_{\sigma,\varphi}\right)(x,u)|_{u=0} = \int_{x'}\int_{u'} \sigma\frac{d}{dx}\mathcal{R}_{\sigma,\varphi}(x-x',-u')J(x',u')dx'du'$$

$$= \int_{x'}\int_{u'} s\sigma\frac{d\mathcal{R}_{s\sigma,\varphi}(sx-sx',-su')}{dx}$$

$I(sx',su')dx'du'$ (using Lemma 1)

$$= \int_w\int_v s\sigma\frac{d\mathcal{R}_{s\sigma,\varphi}(sx-w,-v)}{dx}I(w,v)\frac{dw}{s}\frac{dv}{s}$$

$(w=sx', v=su')$ $$= \int_w\int_v s\sigma\frac{d\mathcal{R}_{s\sigma,\varphi}(sx-w,-v)}{d(sx-w)}\frac{d(sx-w)}{dx}$$

-continued $$I(w,v)\frac{dw}{s}\frac{dv}{s}$$

$$=\frac{1}{s}\left(I*s\sigma\frac{d}{dx}\mathcal{R}_{s\sigma,\varphi'}\right)(sx,su)|_{su=0}$$

Proof of Proposition 4:

$$\left(J*\sigma\frac{d}{dx}\mathcal{R}_{\sigma,\varphi}\right)(x,u)|_{u=0}=\int_{x'}\int_{u'}\sigma\frac{d}{dx}\mathcal{R}_{\sigma,\varphi}(x-x',-u')J(x',u')dx'du'$$

$$=\int_{x'}\int_{u'}s\sigma\frac{d\mathcal{R}_{s\sigma,\varphi}(sx-sx',-u')}{dx}$$

$I(sx',u')dx'du'$ (using Lemma 2)

$$=\int_{w}\int_{u'}s\sigma\frac{d\mathcal{R}_{s\sigma,\varphi'}(sx-w,-u')}{dx}I(w,u')\frac{dw}{s}du'$$

$(w=sx')$ $$=\int_{w}\int_{u'}s\sigma\frac{d\mathcal{R}_{s\sigma,\varphi'}(sx-w,-u')}{d(sx-w)}\frac{d(sx-w)}{dx}$$

$$I(w,u')\frac{dw}{ds}du'$$

$$=\left(I*s\sigma\frac{d}{dx}\mathcal{R}_{s\sigma,\varphi'}\right)(sx,u)|_{u=0}$$

Proof of Proposition 5:

$$\left(J*\sigma^2\frac{d^2}{dx^2}\mathcal{R}_{\sigma^2,\varphi}\right)(x,u)|_{u=0}=\int_{x'}\int_{u'}\sigma^2\frac{d^2}{dx^2}\mathcal{R}_{\sigma,\varphi}(x-x',-u')$$

$J(x',u')dx'du'$ $$=\int_{x'}\int_{u'}s\sigma^2\frac{d^2\mathcal{R}_{s\sigma,\varphi}(sx-sx',-su')}{dx^2}$$

$I(sx',su')dx'du'$ (using Lemma 1)

$$=\int_{w}\int_{v}s\sigma^2\frac{d^2\mathcal{R}_{s\sigma,\varphi}(sx-w,-v)}{dx^2}I(w,v)$$

$$\frac{dw}{s}\frac{dv}{s}(w=sx',v=su')$$

$$=\int_{w}\int_{v}s\sigma^2\frac{d^2\mathcal{R}_{s\sigma,\varphi}(sx-w,-v)}{d(sx-w)^2}\frac{d(sx-w)^2}{dx^2}$$

$$I(w,v)\frac{dw}{s}\frac{dv}{s}$$

$$=\frac{1}{s}\left(I*s^2\sigma^2\frac{d^2}{dx^2}\mathcal{R}_{s\sigma,\varphi}\right)(sx,su)|_{su=0}$$

Proof of Proposition 6:

$$\left(J*\sigma^2\frac{d^2}{dx^2}\mathcal{R}_{\sigma,\varphi}\right)(x,u)|_{u=0}=\int_{x'}\int_{u'}\sigma^2\frac{d^2}{dx^2}\mathcal{R}_{\sigma,\varphi}(x-x',-u')J(x',u')$$

$dx'du'$ $$=\int_{x'}\int_{u'}s\sigma^2\frac{d^2\mathcal{R}_{s\sigma,\varphi}(sx-sx',-u')}{dx^2}$$

$I(sx',u')dx'du'$ (using Lemma 2)

$$=\int_{w}\int_{u'}s\sigma^2\frac{d^2\mathcal{R}_{s\sigma,\varphi'}(sx-w,-u')}{dx^2}$$

$$I(w,u')\frac{dw}{s}du'\ (w=sx')$$

$$=\int_{w}\int_{u'}s\sigma^2\frac{d^2\mathcal{R}_{s\sigma,\varphi'}(sx-w,-u')}{d(sx-w)^2}\frac{d(sx-w)^2}{dx^2}$$

$$I(w,u')\frac{dw}{s}du'$$

$$=\left(I*s^2\sigma^2\frac{d^2}{dx^2}\mathcal{R}_{s\sigma,\varphi'}\right)(sx,u)|_{u=0}$$

Proof of Proposition 7: For $\forall \alpha \in (-1,1)$, we have that:

$$\langle f(x-\alpha u)\mathcal{R}_{\sigma,\varphi'}(x,u)\rangle=\int_{-\infty}^{\infty}\int_{-\infty}^{\infty}f(x-\alpha u)\frac{1}{\sigma\sqrt{2\pi}}e^{-\frac{(x-\alpha u)^2}{2\sigma^2}}dxdu$$

$$=\int_{-\infty}^{\infty}\int_{-\infty}^{\infty}f(w)\frac{1}{\sigma\sqrt{2\pi}}e^{-\frac{w^2}{2\sigma^2}}dwdu$$

$$=\langle f(x)\mathcal{R}_{\sigma,0}(x,u)\rangle,$$

where $\varphi'=\arctan(\alpha)$.

What is claimed is:

1. A method for processing light field images of a three-dimensional scene, the method implemented on a computer system and comprising:
   accessing an (image,view) domain representation of the light field images of the three-dimensional scene, wherein the (image,view) domain representation of the light field images is a representation of the light field images as a function of (image) and (view) dimensions;
   applying a scale-depth transform to transform the (image, view) domain representation to an (image, scale, depth) domain representation, wherein the (image,scale,depth) domain representation is a representation of the light field images as a function of (image), (scale) and (depth) dimensions and the scale-depth transform is based on a kernel that is two-dimensional in the (image) domain; and
   processing the (image,scale,depth) domain representation of the three-dimensional scene, wherein processing the (image,scale,depth) domain representation comprises at least one of (a) estimating depth in the three-dimensional scene based on processing the (image, scale,depth) domain representation or (b) extracting three-dimensional features in the three-dimensional scene based on processing the (image, scale, depth) domain representation.

2. The method of claim 1 wherein the kernel for the scale-depth transform is one-dimensional in the (depth) domain.

3. The method of claim 1 wherein a (scale) portion of the scale-depth transform is based on a Gaussian kernel or one of its derivatives.

4. The method of claim 1 wherein a (depth) portion of the scale-depth transform is based on points at different depths in the three-dimensional scene creating different curves in the (image,view) domain.

5. The method of claim 4 wherein the (depth) portion of the scale-depth transform is based on points at different depths in the three-dimensional scene creating rays at different angles in the (image,view) domain.

6. The method of claim 5 wherein applying the scale-depth transform comprises:

convolving the (image,view) domain representation with the Ray-Gaussian kernel or its derivative for $\sigma_x \in \{\sigma_1, \ldots, \sigma_n\}$, $\sigma_y \in \{\sigma_1, \ldots, \sigma_n\}$ and for $\phi \in \{\phi_1, \ldots, \phi_m\}$; and repeating (k−1) times the step of downsampling the (image,view) domain representation by p and convolving with the Ray-Gaussian kernel or its derivative for $\sigma_x \in \{\sigma_1, \ldots, \sigma_n\}$, $\sigma_y \in \{\sigma_1, \ldots, \sigma_n\}$ and for $\phi \in \{\phi_1, \ldots, \phi_m\}$; where n is the number of samples per downsampling range of scale, m is the number of samples in the depth domain, and p is the downsampling factor.

7. The method of claim 5 wherein applying the scale-depth transform comprises:

convolving the (image,view) domain representation with the Ray-Gaussian kernel or its derivative for $\sigma_x \in \{\sigma_1, \ldots, \sigma_n\}$, $\sigma_y \in \{\sigma_1, \ldots, \sigma_n\}$ and for $\phi \in \{\phi_1, \ldots, \phi_m\}$;

repeating (k−1) times the step of downsampling an image portion of the (image,view) domain representation by p and convolving with the Ray-Gaussian kernel or its derivative for $\sigma_x \in \{\sigma_1, \ldots, \sigma_n\}$, $\sigma_y \in \{\sigma_1, \ldots, \sigma_n\}$ and for $\{(\phi'_1, \ldots, \phi'_m\}$; where n is the number of samples per downsampling range of scale, m is the number of samples in the depth domain, and p is the downsampling factor.

8. The method of claim 7 wherein the scale-depth transform is based on second-order partial derivative Ray-Gaussian transforms, and estimating depth in the three-dimensional scene comprises finding extrema of a determinant of a Hessian of normalized second-order partial derivative Ray-Gaussian transforms.

9. The method of claim 8 wherein the scale-depth transform is based on second-order partial derivative Ray-Gaussian transforms, and extracting three-dimensional features comprises finding extrema of a determinant of a Hessian of normalized second-order partial derivative Ray-Gaussian transforms and estimating blobs in the three-dimensional scene based on the extrema of the determinant of the Hessian.

10. The method of claim 1 wherein the scale-depth transform is based on a Ray-Gaussian kernel $$\mathcal{R}_{\sigma_x,\sigma_y,\varphi}(x,y,u) = \frac{1}{2\pi\sigma_x\sigma_y} e^{-\frac{(x-u\tan\varphi)^2}{2\sigma_x^2} - \frac{y^2}{2\sigma_y^2}}$$

or one of its derivatives, wherein x and y are (image) coordinates, u is a (view) coordinate, $\sigma_x$ and $\sigma_y$ are (scale) coordinates, and $\phi$ is a (depth) coordinate.

11. The method of claim 1 wherein processing the (image,scale,depth) domain representation of the three-dimensional scene comprises estimating depth in the three-dimensional scene based on processing the (image,scale,depth) domain representation.

12. The method of claim 1 wherein processing the (image,scale,depth) domain representation of the three-dimensional scene comprises extracting features in the three-dimensional scene based on processing the (image,scale,depth) domain representation.

13. The method of claim 1 wherein the light field images of the three-dimensional scene are taken from regularly spaced viewpoints.

14. The method of claim 1 wherein the light field images of the three-dimensional scene are captured by a plenoptic imaging system.

15. The method of claim 14 wherein the light field images of the three-dimensional scene are captured by a plenoptic imaging system, and the deterministic relation between the (scale) and (depth) domains are determined by the plenoptic imaging system.

16. The method of claim 14 wherein the step of processing the (image,scale,depth) domain representation includes searching over the (image,scale,depth) domain, and the deterministic relation between the (scale) and (depth) domains reduces a computational complexity of the search.

17. The method of claim 1 wherein the light field images have a deterministic relation between the (scale) and (depth) domains, and the step of processing the (image,scale,depth) domain representation makes use of the deterministic relation.

18. A non-transitory tangible computer readable medium containing computer program code for instructing a computer system to implement a method for processing light field images of a three-dimensional scene, the method comprising:

accessing an (image,view) domain representation of the light field images of the three-dimensional scene, wherein the (image,view) domain representation of the light field images is a representation of the light field images as a function of (image) and (view) dimensions;

applying a scale-depth transform to transform the (image,view) domain representation to an (image, scale, depth) domain representation, wherein the (image,scale,depth) domain representation is a representation of the light field images as a function of (image), (scale) and (depth) dimensions and the scale-depth transform is based on a kernel that is two-dimensional in the (image) domain; and processing the (image,scale,depth) domain representation of the three-dimensional scene, wherein processing the (image,scale,depth) domain representation comprises at least one of (a) estimating depth in the three-dimensional scene based on processing the (image,scale,depth) domain representation or (b) extracting three-dimensional features in the three-dimensional scene based on processing the (image, scale, depth) domain representation.

19. The non-transitory tangible computer readable medium of claim 18 wherein a (scale) portion of the scale-depth transform is based on a Gaussian kernel or one of its derivatives.

20. The non-transitory tangible computer readable medium of claim 18 wherein a (depth) portion of the scale-depth transform is based on points at different depths in the three-dimensional scene creating rays at different angles in the (image,view) domain.

* * * * *